(12) United States Patent
Hayder

(10) Patent No.: US 12,108,755 B2
(45) Date of Patent: Oct. 8, 2024

(54) PACKABLE GAME EXTRACTION SLED

(71) Applicant: John Anthony Hayder, Victor, MT (US)

(72) Inventor: John Anthony Hayder, Victor, MT (US)

( * ) Notice: Subject to any disclaimer, the term of this patent is extended or adjusted under 35 U.S.C. 154(b) by 0 days.

(21) Appl. No.: 17/736,545

(22) Filed: May 4, 2022

(65) Prior Publication Data

US 2022/0354106 A1 Nov. 10, 2022

Related U.S. Application Data

(60) Provisional application No. 63/258,450, filed on May 6, 2021.

(51) Int. Cl.
*A01M 31/00* (2006.01)

(52) U.S. Cl.
CPC ................... *A01M 31/006* (2013.01)

(58) Field of Classification Search
CPC ........ A61G 1/00; A01M 31/006; A01M 31/00
See application file for complete search history.

(56) References Cited

U.S. PATENT DOCUMENTS

| | | | | |
|---|---|---|---|---|
| 4,173,351 A | * | 11/1979 | Hetland | B62B 15/007 280/18 |
| 5,104,133 A | * | 4/1992 | Reiner | A01G 20/43 383/127 |
| 7,422,220 B2 | * | 9/2008 | Walkingshaw | A61G 1/013 280/18 |
| 7,547,024 B1 | * | 6/2009 | Dell | B62B 15/00 119/725 |
| D712,796 S | * | 9/2014 | Calkin | D12/128 |
| 9,550,512 B2 | * | 1/2017 | Schioler | A22B 7/006 |
| 2007/0136950 A1 | * | 6/2007 | Zuercher | A61G 7/0504 5/627 |

* cited by examiner

*Primary Examiner* — Derek J Battisti
(74) *Attorney, Agent, or Firm* — Mitchell S. W. Vap

(57) ABSTRACT

The presently disclosed apparatus is in the field of game sleds utilized to assist with game hauling after a successful hunt in remote areas. The game sled disclosed herein provides a hunter with a lightweight, durable sled, which can be attached to a hunter's pack and deployed to extract game that is downed in a remote area where vehicular transportation of the downed game is not allowed, or impossible. The Packable Game Extraction Sled disclosed herein is comprised of a novel tensioning means and spreader bar, which automatically configures the front end of the sled into a semi-rigid bow shape to aid in pulling the loaded sled over obstacles and through snow.

14 Claims, 5 Drawing Sheets

PACKABLE GAME EXTRACTION SLED

CROSS REFERENCE TO RELATED APPLICATIONS

This Nonprovisional application claims the benefit of U.S. Provisional Application No. 63/258,450 filed on May 6, 2021, the disclosure of which is incorporated fully by reference herein to provide continuity of disclosure.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The presently disclosed apparatus is in the field of game sleds utilized to assist with game hauling after a successful hunt in remote areas. The game sled disclosed herein provides a hunter with a lightweight, durable sled, which can be attached to a hunter's pack and deployed to extract game that is downed in a remote area where vehicular transportation of the downed game is not allowed, or impossible.

Many different game sleds exist in the prior art. Game sleds in the prior art consist of rigid devices with characteristics similar to a snow sled. Such rigid devices are useful for game transport due their rigid construction; however, such devices are indiscreet and unwieldy to transport during an actual hunt in remote locations. Other game sleds in the prior art consist of flimsy pieces of plastic material, which can be packed and transported in a discreet manner during a hunt but suffer from being non-durable and easily damaged during actual game transport.

As such, the herein described Packable Game Extraction Sled seeks to provide a light, indiscreet, packable device that once deployed exhibits characteristics of a rigid sled and is durable enough to withstand game hauling from remote, rugged locations.

BRIEF SUMMARY OF THE INVENTION

The herein described Packable Game Extraction Sled is a light weight, 3.5 pound sled comprised of thermoplastic polyelefin comprised of a polyester internal webbing. As such, the thermoplastic polyelefin is tear and puncture resistant. Furthermore, the thermoplastic polyelefin material stays pliable and does not become brittle in cold temperatures generally encountered in North American hunting seasons. The Packable Game Extraction Sled is very durable and capable of repeated use in rough terrain. When in its packable configuration, the Packable Game Extraction Sled rolls up into an approximate 4 inch diameter cylinder, which is approximately 24 inches in length. In the packable configuration a hunter can easily secure the Packable Game Extraction Sled to a backpack or stow the Packable Game Extraction Sled completely inside of a backpack.

In addition to the novel features described above, the Packable Game Extraction Sled is comprised of a novel spreader bar and tensioning mechanism, which configures the first front end of the sled into a semi-rigid bow shape when a user pulls on the sled's pull rope. The spreader bar maintains the sled's bow shape to aid in pulling the sled over obstacle such as rocks or logs. Also, the bow shape aids in providing floatation of the loaded sled in snow conditions, which are often encountered in North American big game hunting seasons.

To utilize the Packable Game Extraction Sled a hunter deploys the sled by unrolling the sled so that the spreader bar is facing up. Game is then loaded onto the sled and lashed to the sled utilizing a plurality of grommets through which any game retention means can be connected to secure the game animal to the sled. Such retention means would include paracord, rope, bungees, and any other similar means of lashing the game animal to secure it to the sled. Once the game is secured to the sled, the hunter pulls on the pull rope to move the sled. Tension provided by the hunter pulling on the pull rope automatically tensions the spreader bar, which causes the first front end of the sled to configure into a bow shape to aid in pulling the loaded sled over obstacles and through snow.

DETAILED DESCRIPTION OF THE INVENTION

Figure 1:
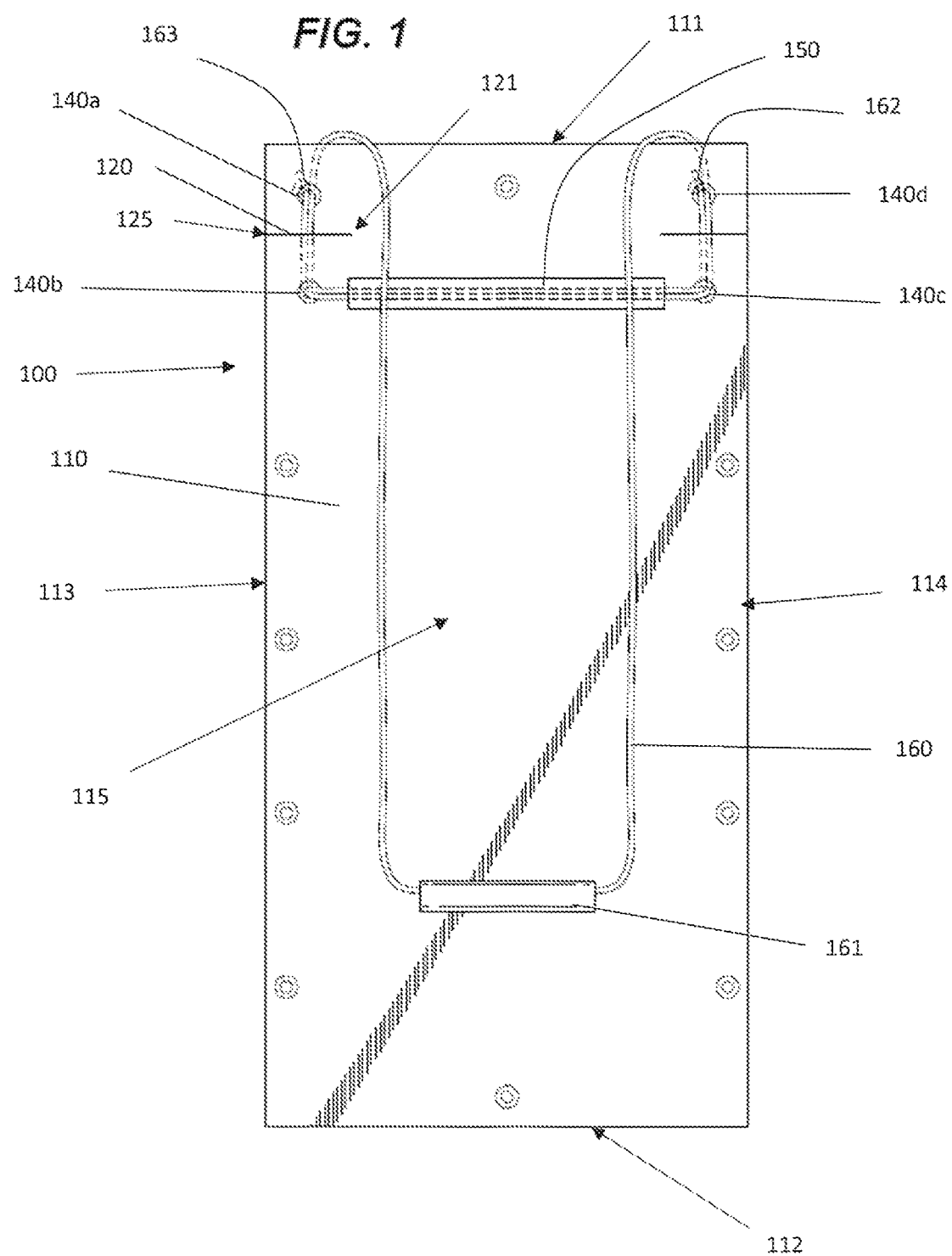
FIG. 1 is an overhead plan view of the device in its deployed state.

Although only one embodiment of the invention is explained in detail, the figures and explanations should be understood as illustrations only and are not intended to limit the invention in its scope. Also, in describing the embodiment, specific terminology may be used, but it should be understood that specific terms include all technical equivalents that operate in similar manners to accomplish similar purposes.

The herein described Packable Game Extraction Sled 100 comprises a light weight, 3.5 pound sled. The Packable Game Extraction Sled 100, wherein the body 110 of the sled is preferably rectangular in shape when fully deployed. In the preferred embodiment, said rectangular body 110 is 48 inches in length and 24 inches in width. Said body 110 of the Packable Game Extraction Sled 100 is preferably further comprised of a first front end 111, a second back end 112 a first lateral side 113 and a second lateral side 114. Said Packable Game Extraction Sled 100 is further comprised of a top surface 115 and a bottom surface 116. One familiar in the art would recognize that the body 110 of the sled could be comprised of alterative shapes, which would maintain the features described herein and would be functionally equivalent to the preferred embodiment.

In the preferred embodiment, the body 110 of the Packable Game Extraction Sled 100 is comprised of thermoplastic polyelefin. Preferably, said thermoplastic polyelefin material is further comprised of an internally woven fiber matrix for added durability. Said fiber matrix is preferably polyester fiber; however, any synthetic fiber capable of weaving and being embedded within said thermoplastic polyelefin would perform the functions stated herein. As such, the polyester fiber reinforced thermoplastic polyelefin is very tear and puncture resistant. Furthermore, the polyester fiber reinforced thermoplastic polyelefin material stays pliable and does not become brittle in cold temperatures generally encountered in North American hunting seasons. Therefore, the Packable Game Extraction Sled is very durable and capable of repeated use in rough terrain.

Figure 2:
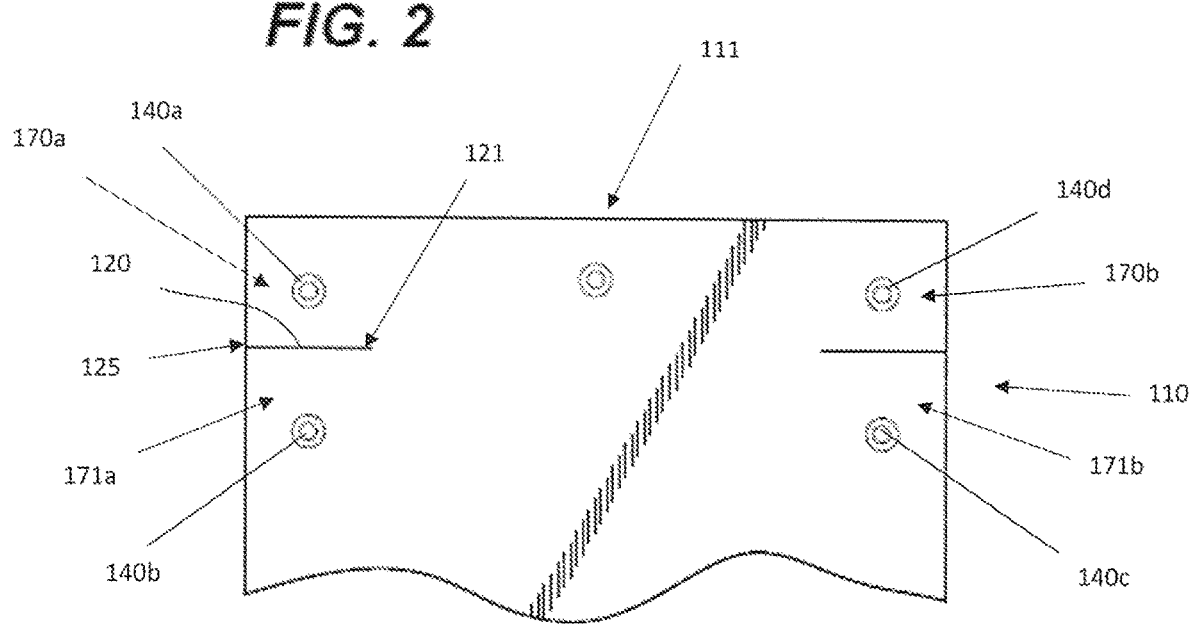
FIG. 2 is an overhead plan view of the first front end of the device with spreader bar and pull rope removed showing lateral slits, which aid in front bow configuration when pull rope is tensioned.
Figure 3:
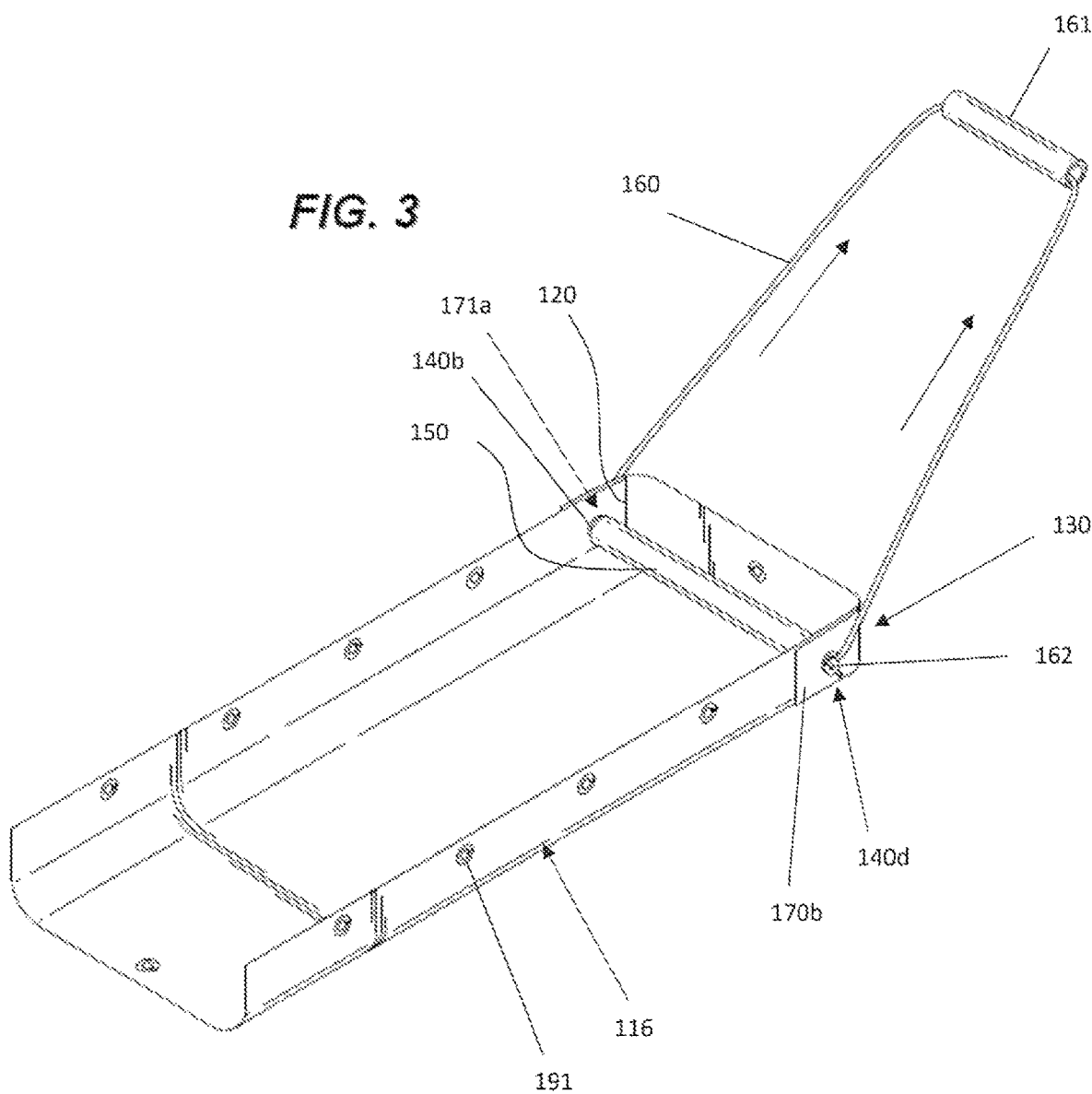
FIG. 3 is a perspective view showing front bow configuration when pull rope is tensioned.

Referring now to FIGS. 1-3, the first front end 111 of the body 110 is further comprised of two symmetrical lateral slits 120, which extend from a perimeter 125 of said first lateral side 113 and said second lateral side 114 of said sled body 110 to a symmetrical point internal to said body 121. In the preferred embodiment, the length of said symmetrical lateral slits 120 is 5 inches, wherein said symmetrical slits 120 are cut from the perimeter 125 of said first lateral side 113 and said second lateral side 114 of said sled body 110 to said symmetrical points internal to said body 121. In the preferred embodiment, said symmetrical slits 120 are cut 5 inches posterior to a perimeter of said first front end 111 and perpendicular to the perimeter 125 of said first lateral side 113 and said second lateral side 114 of said sled body 110. The purpose of said symmetrical slits 120 is to allow the first front end 111 of said sled body 110 to configure into a bow 130 during sled use.

Still referring to FIGS. 1-3, the body 110 is further comprised of two symmetrical sets of pull rope grommets 140 disposed near the first front end 111 of the body 110. Said pull rope grommets 140 are comprised of a first side external pull rope grommet 140a and a first side internal pull rope grommet 140b and a second side internal pull rope grommet 140c and a second side external pull rope grommet 140d. Said external pull rope grommets 140a, 140d and said internal pull rope grommets 140b, 140c are disposed on either side of each symmetrical lateral slit 120. Specifically said external pull rope grommets 140a, 140d are disposed proximal of said symmetrical lateral slit 120 and said internal pull rope grommets 140b, 140c are disposed distal of said symmetrical lateral slit 120. Each set of pull rope grommets are configured to match up to one another to form the bow 130 configuration during sled use.

Said Packable Game Extraction Sled 100 is further comprised of a spreader bar 150. In the fully deployed state, said spreader bar 150 is disposed lengthwise approximately between said internal pull rope grommets 140b, 140c. Said spreader bar 150 is further comprised of a lengthwise threading means, through which a pull rope 160 is threaded. Said threading means is preferably an open interior diameter of said spreader bar 150; however, other means of threading said pull rope 160 through or lengthwise along said spreader bar could be utilized such as sequential eye hooks, tubing, or any other means connected to said spreader bar, which would allow for lengthwise threading of said pull rope. In the preferred embodiment, said spreader bar is 14.5 inches in length and comprises a 0.75 inch diameter polyvinyl chloride pipe. Those familiar in the art would also recognize that any rigid material with an open interior diameter would perform the required function of said spreader bar and alternative materials and shapes of said materials are contemplated in the present disclosure. The purpose of said spreader bar 150 is to provide structural rigidity to the bow 130 configuration of the sled body when said pull rope 160 is tensioned.

Figure 5:
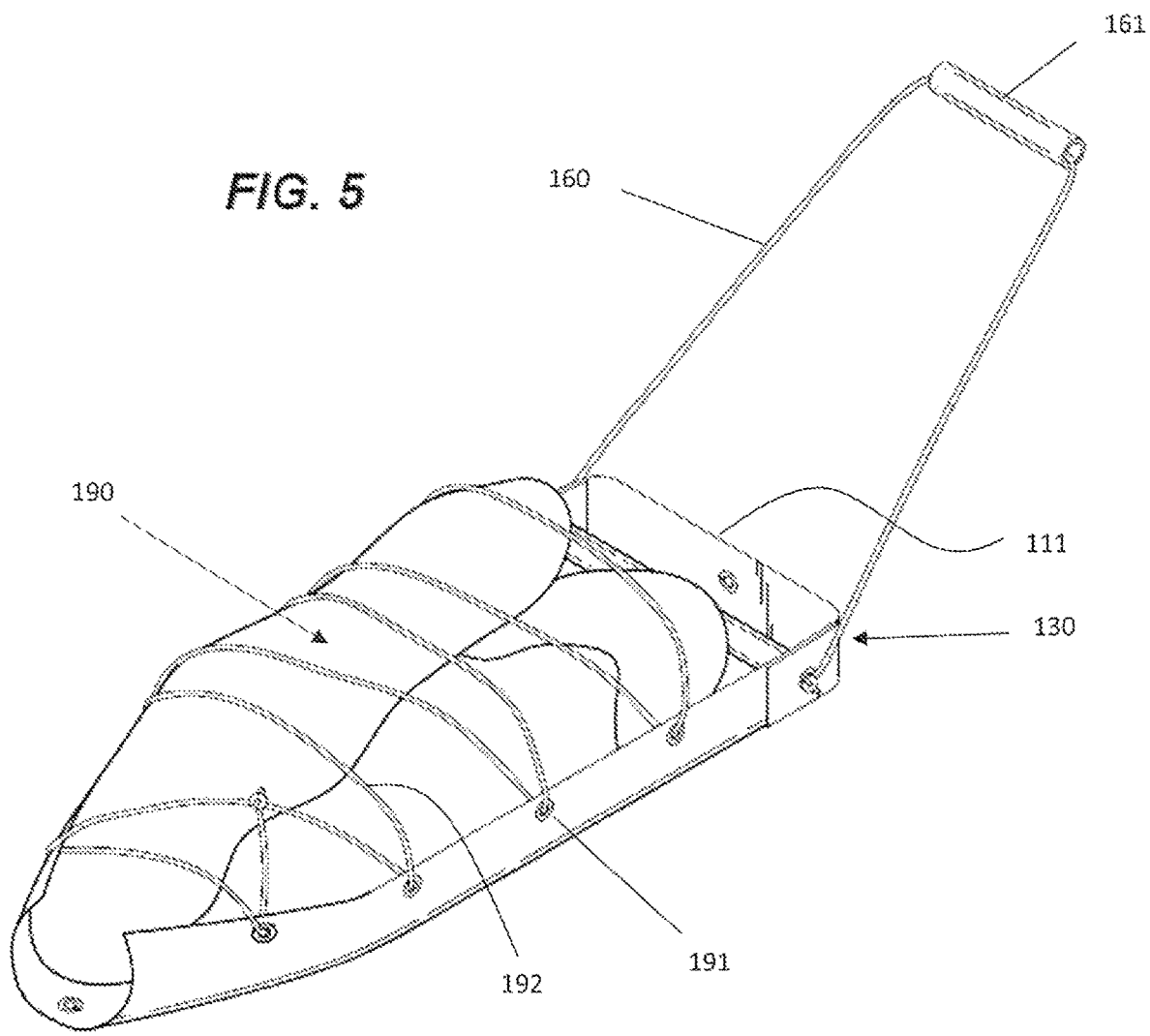
FIG. 5 is perspective view of a loaded Packable Game Extraction Sled showing front bow configuration when pull rope is tensioned.

Referring now to FIGS. 1, 3 and 5, said Packable Game Extraction Sled 100 is further comprised of a pull rope 160. Said pull rope 160 is preferably a 0.25 inch diameter diamond braid polyester rope cut to a length of 15 feet. Those familiar in the art would recognize that any durable rope of similar size would perform the function of the pull rope described herein and such alternative materials acre contemplated and incorporated in the present disclosure. Said pull rope 160 may include a pull rope handle 161, which a user grabs to pull the loaded sled.

In addition to the novel features described above, the Packable Game Extraction Sled 100 is comprised of a novel tensioning mechanism, which configures the first front end 111 of the sled into a semi-rigid bow 130 shape when a user pulls on the sled's pull rope 160. Referring to FIG. 1, said pull rope 160 is sequentially configured in the following manner: A first end of the pull rope 160 is threaded through the bottom surface 116 side of said first side external pull rope grommet 140a; the bottom surface 116 side of said first side internal pull rope grommet 140b; through the interior of said spreader bar 150; through the top surface 115 side of said second side internal pull rope grommet 140c, and through the top surface 115 side of said second side external pull rope grommet 140d. Said first end of said pull rope is then terminated with a first stopper means 162. Said first stopper means 162 functions as a stopper when said pull rope 160 is tensioned. Preferably, said first stopper means is a knot. A second end of said pull rope 160 is then threaded through the bottom surface 116 side of said second side external pull rope grommet 140d; the bottom surface 116 side of said second side internal pull rope grommet 140c; through the interior of said spreader bar 150; through the top surface 115 side of said first side internal pull rope grommet 140b; and through the top surface 115 side of said first side external pull rope grommet 140a. Said second end of said pull rope 160 is then terminated with a second stopper means 163. Said second stopper means 163 functions as a stopper when said pull rope 160 is tensioned. Preferably, said second stopper means is a knot. One familiar in the art would recognize that said first and second stopper means 162 and 163 could be comprised of any means to prevent the ends of said pull rope from retracting back through pull rope grommets 140a, 140b, 140c, and 140d when said pull rope 160 is tensioned. Such stopper means could include clamps, cord locks, cam locks, washers, and adhesives. Any such stopper means are contemplated by the present disclosure and fully incorporated herein.

Referring now to FIGS. 3 and 5 the Packable Game Extraction Sled's 100 bow 130 feature is configured in the following manner. When a user pulls on said pull rope 160, tension is applied to said pull rope 160. As the pull rope 160 tensions, said first and second stopper means 162 and 163 are drawn toward said first side external pull rope grommet 140a and said second side external pull rope grommet 140d. Once said stopper means 162 and 163 contact said first side external pull rope grommet 140a and said second side external pull rope grommet 140d, the opposing stopper means 162 and 163 are further drawn toward the opposing ends of said spreader bar 160. As opposing tension of said stopper means 162 and 163 increases, a first side external flap 170a and second side external flap 170b is created by said symmetrical slits 120. Once full opposing tension of said stopper means 162 and 163 is achieved, the tension of the pull rope 160 exerting tension on each opposing stopper means 162 and 163 results in each set of pull rope grommets to match up to one another. Specifically, first side external pull rope grommet 140a matches up with first side internal pull rope grommet 140b. Simultaneously, second side external pull rope grommet 140d matches up with second side internal pull rope grommet 140c. Opposing tension of said stopper means 162 and 163 compresses the opposing matched up pull rope grommets to their corresponding end of said spreader bar 150. As full tension is achieved said bow 130 feature is configured by said external flaps 170a and 170b overlapping their corresponding first side internal flap 171a and first side internal flap 171b created by said symmetrical slits 120. Once configured the opposing tension of said stopper means 162 and 163 against the ends of said spreader bar 150 maintains the sled body's bow shape 130 in a semi-rigid configuration to aid in pulling the sled over obstacles such as rocks or logs. Also, the bow 130 shape aids in providing floatation of the loaded sled in snow conditions, which are often encountered in North American big game hunting seasons.

Figure 4:
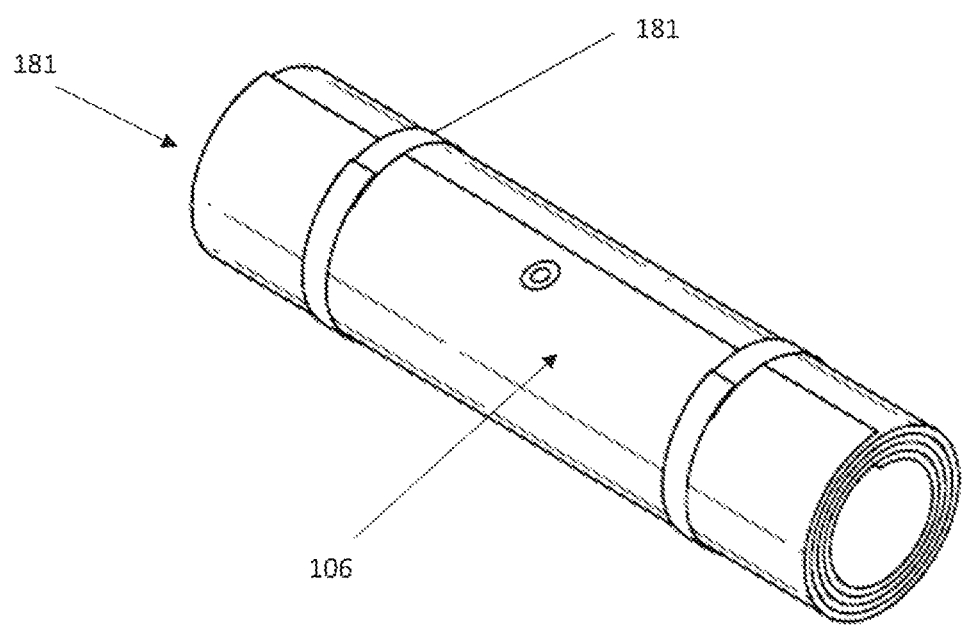
FIG. 4 is a perspective view of the device in rolled up packable configuration.

Now referring to FIG. 4, in its packable configuration 180, the preferred embodiment of the Packable Game Extraction Sled 100 rolls up into an approximate 4 inch diameter cylinder, which is approximately 24 inches in length. Once rolled up into the packable configuration 180 securing means 181 can be utilized to maintain the Packable Game Extraction Sled 100 in a tight and secure roll. Preferably, said securing means are comprised of two hook and loop straps; however, one familiar in the art would recognize that any similar securing means could be utilized such as rope, string, bungees, cam straps, etc. In the packable configuration a hunter can easily secure the Packable Game Extraction Sled to a backpack or stow the Packable Game Extraction Sled completely inside of a backpack.

To utilize the Packable Game Extraction Sled 100 a hunter deploys the sled by unrolling the sled body so that said top surface 115 and spreader bar 150 are facing up and said bottom surface 116 is facing down as generally shown in FIG. 3. As shown in FIG. 5, game 190 is then loaded onto the sled body and lashed to the sled utilizing a plurality of securing grommets 191 disposed along the perimeter of the sled body through which any game retention means 192 can be connected to secure the game 190 animal to the sled. Such retention means 192 would include paracord, rope, bungees, and any other similar means of lashing the game animal to secure it to the sled. Once the game is secured to the sled, the hunter pulls on the pull rope 160 to move the sled. Tension provided by the hunter pulling on the pull rope 160 automatically configures the first front end 111 of the sled into the bow 130 shape as described above to aid in pulling the loaded sled over obstacles and through snow. One familiar in the art would recognize use of the device described herein is limited to game extraction and the device would be capable of hauling other items.

It is understood that the foregoing examples are merely illustrative of the present invention. Certain modifications of the articles and/or methods may be made and still achieve the objectives of the invention. Such modifications are contemplated as within the scope of the claimed invention

What is claimed is:

1. A Packable Game Extraction Sled comprising:
   A. a body, wherein said body is comprised of a first front end, a second back end, a first lateral side, a second lateral side, a top surface; and a bottom surface; wherein
   B. said first front end is further comprised of two symmetrical lateral slits, which extend from a perimeter of said first lateral side and said second lateral side of said body to a symmetrical point internal to said body;
   C. two symmetrical sets of pull rope grommets disposed near the first front end of said body, wherein said pull rope grommets are comprised of a first side external pull rope grommet, a first side internal pull rope grommet, a second side internal pull rope grommet, and a second side external pull rope grommet, wherein said external pull rope grommets are disposed proximal of said symmetrical lateral slits and said internal pull rope grommets are disposed distal of said symmetrical lateral slits;
   D. a tensioning mechanism comprising a first front end spreader bar comprised of a threading means, wherein said spreader bar is disposed near the first front end of said body lengthwise approximately between said internal pull rope grommets; and
   a pull rope, wherein a first end of said pull rope is sequentially threaded through the bottom surface side of said first side external pull rope grommet; the bottom surface side of said first side internal pull rope grommet; through the threading means of said spreader bar; through the top surface side of said second side internal pull rope grommet, and through the top surface side of said second side external pull rope grommet, wherein said first end of said pull rope is terminated with a first stopper means; and a second end of said pull rope is threaded through the bottom surface side of said second side external pull rope grommet; the bottom surface side of said second side internal pull rope grommet; through the threading means of said spreader bar; through the top surface side of said first side internal pull rope grommet; and through the top surface side of said first side external pull rope grommet, wherein said second end of said pull rope is terminated with a second stopper means; wherein
   opposing tension of said first and second stopper means provided by a user pulling on said pull rope automatically configures said first front end of the sled body into a bow shape, by a first side external flap overlapping its corresponding first side internal flap, and a second side external flap overlapping its corresponding second side internal flap, wherein said first front end spreader bar is fully contained within the interior of said first front end of the sled body.

2. The Packable Game Extraction Sled of claim 1, wherein said body is comprised of fiber reinforced thermoplastic polyelefin.

3. The Packable Game Extraction Sled of claim 1, wherein said body is rectangular in shape when fully deployed.

4. The Packable Game Extraction Sled of claim 2, wherein said body is 48 inches in length and 24 inches in width.

5. The Packable Game Extraction Sled of claim 1, wherein said spreader bar is comprised of 0.75 inch diameter polyvinyl chloride pipe.

6. The Packable Game Extraction Sled of claim 1, wherein said threading means is comprised of an open interior diameter of said spreader bar.

7. The Packable Game Extraction Sled of claim 1, wherein said pull rope is comprised of 0.25 inch diameter diamond braid polyester rope.

8. The Packable Game Extraction Sled of claim 1, wherein said body is further comprised of a plurality of securing grommets disposed along the perimeter of said body.

9. The Packable Game Extraction Sled of claim 1, wherein as said pull rope is tensioned, said first and second stopper means are drawn toward said first side external pull rope grommet and said second side external pull rope grommet.

10. The Packable Game Extraction Sled of claim 9, wherein said stopper means contact said first side external pull rope grommet and said second side external pull rope grommet, and said first side external flap and second side external flap are created by said symmetrical slits.

11. The Packable Game Extraction Sled of claim 10, wherein once full opposing tension of said stopper means is achieved, the tension of said pull rope exerting tension on each opposing stopper means results in each set of said pull rope grommets to match up to one another.

12. The Packable Game Extraction Sled of claim 11, wherein opposing tension of said stopper means compresses the matched up pull rope grommets to said matched up pull rope grommets' corresponding ends of said spreader bar and a said first front end bow shape is configured by said external flaps overlapping their corresponding internal flaps first side external flap overlapping said first side internal flap and said second side external flap overlapping said second side internal flap.

13. The Packable Game Extraction Sled of claim 1, wherein said Packable Game Extraction Sled comprises a rolled up packable configuration.

14. The Packable Game Extraction Sled of claim 12, wherein said packable configuration of said Packable Game Extraction Sled is comprised of an approximate 4 inch diameter cylinder, which is approximately 24 inches in length.

* * * * *